United States Patent

Ridenour

[11] Patent Number: 6,012,608
[45] Date of Patent: Jan. 11, 2000

[54] STORAGE AND METERING SYSTEM FOR SUPERSATURATED FEED SUPPLEMENTS

[75] Inventor: Ken W. Ridenour, Amarillo, Tex.

[73] Assignee: K.E.R. Associates, Inc., Amarillo, Tex.

[21] Appl. No.: 09/046,743

[22] Filed: Mar. 24, 1998

[51] Int. Cl.[7] ................................................. B27D 5/08
[52] U.S. Cl. ........................ 222/59; 222/64; 222/146.5; 222/318; 222/424
[58] Field of Search ........................... 222/59, 64, 146.2, 222/146.5, 318, 383.1, 424

[56] References Cited

U.S. PATENT DOCUMENTS

| | | | |
|---|---|---|---|
| 4,002,269 | 1/1977 | Negersmith | 222/318 |
| 5,040,700 | 8/1991 | Compton | 222/146.5 |
| 5,082,142 | 1/1992 | Saidman et al. | 222/318 |
| 5,121,857 | 6/1992 | Hutchinson | 222/318 |
| 5,148,208 | 9/1992 | Klosterboer et al. | 222/318 |
| 5,485,941 | 1/1996 | Guyomard et al. | 222/318 |
| 5,678,734 | 10/1997 | Walker | 222/146.5 |
| 5,850,938 | 12/1998 | Hebert | 222/146.5 |

*Primary Examiner*—Joseph A. Kaufman
*Attorney, Agent, or Firm*—Arnold, White & Durkee

[57] ABSTRACT

The present invention comprises a storage and metering system for delivery of a supersaturated feed supplement to a feed processing facility including a tank assembly for storing the supersaturated feed supplement; a recirculation and discharge system connected to the storage assembly to maintain the supersaturated feed supplement at an elevated temperature during recirculation and discharge; and a controller assembly for monitoring and controlling the supersaturated feed supplement being recirculated and discharged. The present invention also includes a method of storing, metering, and recirculating a supersaturated feed supplement.

20 Claims, 2 Drawing Sheets

STORAGE AND METERING SYSTEM FOR SUPERSATURATED FEED SUPPLEMENTS

BACKGROUND OF THE INVENTION

The present invention relates to a method and apparatus for storing and metering a fluid, and more particularly a method and apparatus for storing and metering a supersaturated feed supplement.

SUMMARY OF THE INVENTION

The present application is directed to a method and apparatus to be used at a feed lot site for local storage, metering and dispensing of a material such as a supersaturated fluid feed supplement, for example, the zinc methionine supersaturated feed supplement disclosed in U.S. Pat. No. 5,702,718. Such a food supplement is typically a supersaturated liquid (20% or greater solid matter) and, if it is allowed to remain motionless, it may "settle" and form a partial solid which may be very difficult to circulate and apply as a liquid to other feed components.

The present invention resides in a storage and metering system used for delivery of a supersaturated feed supplement for addition to animal feed such as feed for cattle, comprising a tank assembly for storing the supersaturated feed supplement at an elevated temperature; a recirculation and discharge system connected to the storage tank assembly to maintain the supersaturated feed supplement at an elevated temperature during discharge and to recirculate the supplement through the system between discharge periods to prevent formation of partial solids; and a controller assembly for monitoring and controlling the supersaturated feed supplement being recirculated and discharged.

The present invention further resides in a method for storing and metering delivery of a supersaturated liquid, comprising the steps of storing and maintaining said supersaturated liquid at an elevated temperature within a tank assembly; dispensing the supersaturated liquid from the tank assembly into a recirculation and discharge system; and providing the supersaturated liquid to a discharge point or to the tank assembly under control of a controller assembly.

Another embodiment of the present invention resides in a storage and metering system for delivery of a supersaturated feed supplement, comprising a storage tank assembly having an inlet and an outlet for storing the supersaturated feed supplement; a heating element within the tank assembly to maintain the supersaturated feed supplement at a preselected temperature; a pump connected to the tank assembly to discharge the supersaturated feed supplement; a first line connected to the outlet for providing the supersaturated feed supplement to a discharge point; a second line for recirculating the supersaturated feed supplement to the storage tank assembly; a selectable valve connected between the first and second lines to selectively provide the supersaturated feed supplement from the first line to either the second line or the discharge point and a controller assembly for controlling the selectable valve.

DESCRIPTION OF ILLUSTRATIVE EMBODIMENTS

Figure 1:
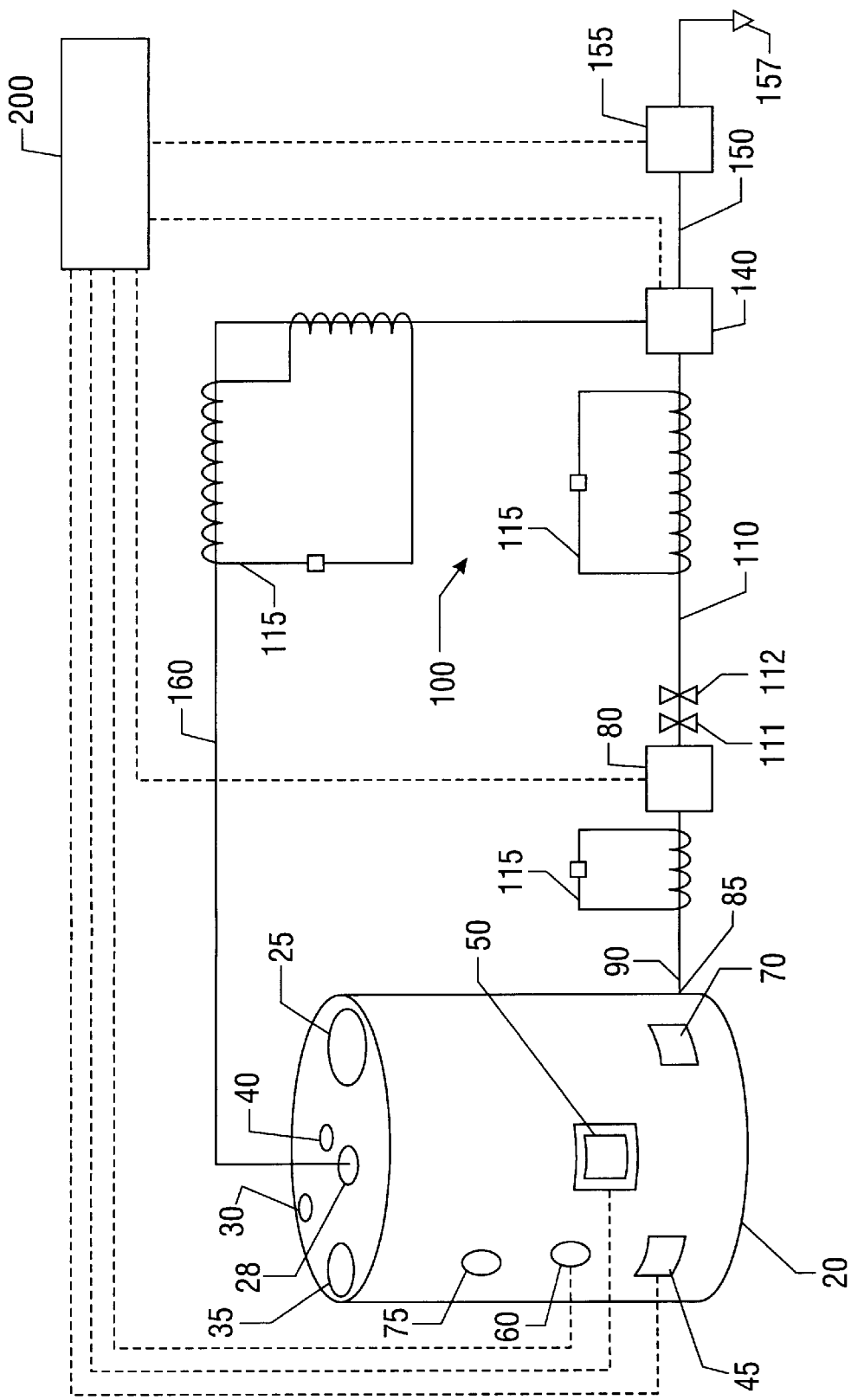
FIG. 1 is a block diagram of an illustrative embodiment of a system according to the present invention.

FIG. 1 is a block diagram of an exemplary system according to the present invention. As shown in FIG. 1, the system 10 includes a storage tank assembly 20, a recirculation and discharge system 100, and a controller assembly 200. In operation, the system 10 is provided at a feed lot site to store and deliver a supersaturated liquid, such as a supersaturated feed supplement, zinc methionine or the like, to a feed preparation facility typically located near a cattle feed lot.

The storage tank assembly 20 may typically be an insulated, jacketed, fiberglass tank. Particularly, in an exemplary embodiment the tank assembly 20 may have an inner surface constructed of high temperature resin fiberglass and an outer tank surface also constructed of fiberglass. Further, for better temperature control of the liquid, the tank assembly 20 may have blown-in insulation (six inches or more in thickness). In an exemplary embodiment, the tank assembly 20 may have a capacity of approximately 10,000 gallons, and be approximately 11 feet in diameter and 17 feet in height (such as that commercially available from MurTex, Inc., Amarillo, Tex.).

Figure 2:
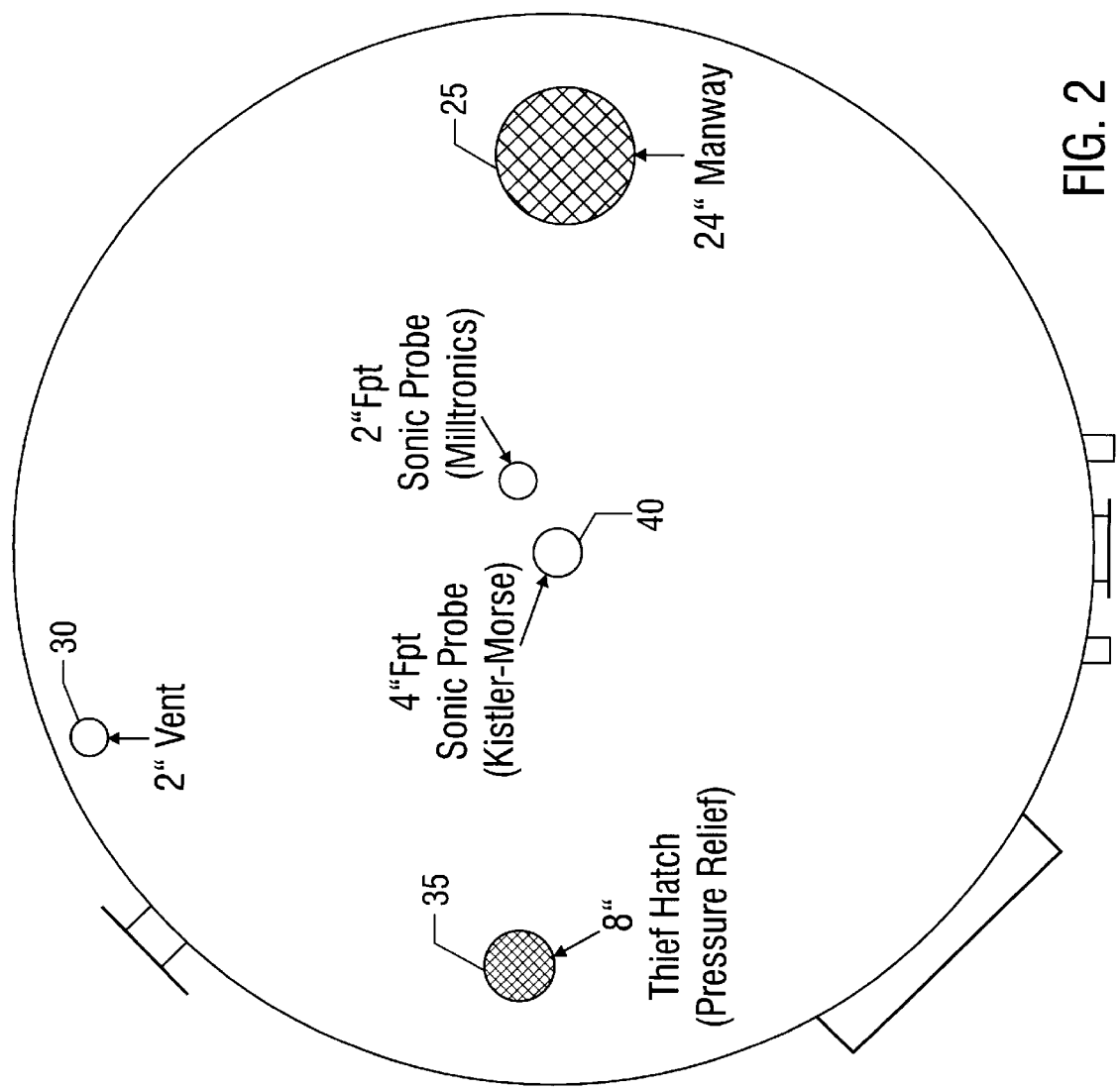
FIG. 2 is a top view of a tank assembly according to the present invention.

FIG. 2 is a top view of the tank assembly 20. As shown in FIG. 2, the tank assembly 20 includes a manway 25 for entry by an operator into the tank itself, as may be required for periodic maintenance or the like. The top of the tank assembly 20 may also include a vent 30 and a pressure relief valve 35. In an exemplary embodiment, the manway 25 may be sized to fit a worker, about 24" in diameter; the vent 30 may be approximately 2" diameter; and the pressure relief valve 35 may be approximately 8" in diameter. Further, the top of the tank assembly 20 may include a recirculation inlet 28 to receive liquid from the recirculation and discharge system 100.

Additionally, the top of the tank assembly 20 may include one or more sensing elements. One of the sensing elements at the top of the tank assembly 20 may be a liquid level monitor 40 to monitor the liquid level in the tank 20. In an exemplary embodiment, the liquid level monitor 40 may be a sonic probe (such as that commercially available from Kistler-Morse, Redmond, Wash. The liquid level monitor 40 is connected to the controller assembly 200 to provide signals to the controller regarding the liquid level within the tank assembly 20.

It is typically desired that the feed supplement be maintained at an elevated temperature of between about 40° F. and 160° F., and more optimally between about 90° F. and 100° F. In normal operation, it is desirable the liquid be maintained between about 91° F. to 94° F. The temperature should be closely controlled, as at a lower temperature, solids will begin to fall out of the supersaturated liquid. Accordingly, the tank assembly 20 may include one or more heating elements 45. In an exemplary embodiment, the heating element 45 is installed near the lower portion of the tank 20 to maintain the liquid at the elevated temperature. The heating element 45 may be an immersion heater or the like, so that it may be placed within the tank assembly 20. The heating element 45 optimally comprises a stainless steel composition so that it may be in contact with the liquid. Further, in an exemplary embodiment, the heating element 45 may be about 80" in length, and have a heating capacity of about 5 kW (such a heater is commercially available from Accutherm Inc., Hannibal, Mo.).

It is desired to maintain constant agitation of the liquid within the tank assembly 20 to further aid in keeping the feed supplement in a supersaturated liquid state and available for dispensing. Thus, the tank assembly 20 may include an agitator 50 or similar device, to cause the liquid within the tank assembly 20 to be recirculated within the tank to maintain its liquid state. The agitator 50 may be driven by a motor. Specifically, the agitator 50 may comprise a propeller (not shown in FIG. 1) having a suitable diameter (approximately 18" in an exemplary embodiment). The propeller is driven by a shaft connected to the motor. For longevity, all wetted parts of the agitator 50 should be made of stainless steel, and optimally 304 Stainless Steel. In an exemplary embodiment, the agitator 50 may be a commercially available agitator, such as model number HVM-5 available from MixMor, Inc., Los Angeles, Calif. In operation, the agitator 50 may be operated such that the propeller rotates at a speed sufficient to maintain a uniform mixture. Such speed varies with the size and pitch of the agitator used, for example, between about 420 rpm and 440 rpm for the above identified commercial unit. However, under certain conditions, speeds beyond these ranges may be desired to maintain the liquid in a supersaturated state.

The storage tank assembly 20 may include other monitors, in addition to the level monitor 40. The side of the tank 20 may include a temperature monitor or thermometer 60 to measure the liquid temperature. The storage tank assembly 20 may also include a low-level detector 70, such as a float switch type (such as commercially available Model 770S from Major Controls, Inc., Tulsa, Okla.), to indicate when the liquid in the tank has dropped to a preselected level. Each of these monitors may provide signals to the controller assembly 200. The side of the tank assembly 20 may also include a side inlet 75 to load the liquid into the tank.

The storage tank assembly 20 may also include a pump 80 to provide the liquid to the recirculation and discharge system 100. In exemplary embodiments, the pump 80 may be a positive displacement gear or progressing cavity type pump. These types of pumps are desirable due to the supersaturated nature and other characteristics of the liquid to be pumped. In practice of the invention, the pump 80 may be powered by a motor such as a DC motor with an AC inverter to provide for simplicity of control (commercially available from Continental Pump Co., St. Louis, Mo.). The pump 80 may also send signals representative of pump operating conditions to the controller assembly 200.

During operation of the system, liquid exits the storage tank assembly 20 via outlet 85 on the lower portion of the tank assembly through an exit line 90, which may include a master valve (not shown in FIG. 1). The exit line 90 may be a pipe or other conduit, such as a ¾ inch diameter stainless steel pipe. To maintain the supersaturated liquid in a desired state, the liquid may be continuously pumped from the tank assembly 20 and recirculated through the recirculation and discharge system 100 while being maintained at an elevated temperature.

The liquid is continuously pumped by the pump 80 from the tank assembly 20 into the recirculation and discharge system 100. The system 100 may include a first line section 110, which may be a pipe or other conduit which may include solenoid valve 111 and check valve 112 to better control flow of the liquid.

In an exemplary embodiment, the first line section 110 may have an inner core having a conduit between about one (1)" and three (3)" in diameter. The inner core is optimally made from a polymer, such as nylon. This section 110 may contain a heater element 115, as it is desired to maintain the temperature of the liquid at about 100° F. In an exemplary embodiment, a self-regulating heater wire 115 with a 10 copper braid may be positioned about or along the conduit (such as commercially available from Furon Co., Chicago, Ill.). The first line 110 may also include a barrier layer surrounding the inner core, and an insulation layer surrounding the barrier layer. In an exemplary embodiment, the barrier layer may be an aluminum molar thermo barrier, and the insulation layer may be a hydrophobic inorganic fibrous glass thermal insulation layer. Finally, the first line section 110 may be jacketed with a flame retardant PVC jacket to protect the system in case of fire.

The first line section 110 is connected to a three-way valve 140. The three-way valve 140 is controlled by signals from the controller assembly 200 to a servo motor or the like (not shown in FIG. 1) which is adapted to selectively position valve 140. The three-way valve 140 has a first output to a discharge line 150 and a second output to a recirculation line 160. Each of these lines may also comprise a pipe or other conduit, and in an exemplary embodiment, may be fabricated in much the same manner as discussed above for the first line section 110.

The discharge line 150 may include a discharge meter 155, which meters the actual fluid diverted from the recirculation system by valve 140 and delivered through the discharge line 150 to a feed lot mixing tank or similar device adjacent to the system of the present invention. The discharge meter 155 provides signals to the controller assembly 200 representative of the amount of fluid dispersed and when dispersed. In an exemplary embodiment, the discharge meter may be an electromagnetic flow meter (such as the ECOFLUX model meter commercially available from Krohne America Inc., Peabody, Mass.). The discharge line 150 terminates in a feed discharge point 157. At the discharge point 157, the liquid may be mixed with other ingredients (molasses); sprayed directly on the feed mix; batch sprayed or mixed directly or via other delivery method with a batch of feed or the like. During operation, it is typical to use a water flush at times to insure that all ingredients are delivered.

The recirculation line 160 takes the supersaturated liquid back to the storage tank assembly 20 and deposits it via a recirculation inlet 28 on the storage tank assembly 20, when the three-way valve 140 is selected to provide the liquid to the recirculation line 160. This typically occurs between times when fluid is delivered to the discharge line 155.

The controller assembly 200 at the local site is used to control, monitor, and record operations and amounts of feed supplement dispensed so that such amounts and information can be used for feed monitoring purposes as well as billing purposes to the feed lot owner. The controller assembly 200 may be remotely connected via modem to provide this information to a central station.

Also, the various meters, monitors, and valves of the system may be all communicated to a central microprocessor of the controller assembly 200, which is programmed to monitor and record data relating to the recirculation, discharging and use of the system. In an exemplary embodiment, the controller assembly 200 may be an appropriately programmed personal computer. The controller assembly 200 may receive or send signals to the liquid level monitor 40, the agitator 50, the thermometer 60, the low-level detector 70 and possibly other devices to monitor operation of the tank assembly 20.

The controller assembly 200 forwards control signals to the heating element 45, the agitator 50, and the pump 80 to control the temperature, agitation, and velocity at which the supersaturated liquid is recirculated. Further, the controller assembly 200 forwards control signals to a servo attached to the three-way valve 140 to select whether the liquid is to be recirculated to the tank assembly 20 or provided to the discharge point 157. The programming and use of controller assembly 200 would be known by a person of ordinary skill with the benefit of this disclosure.

If the liquid is provided to the discharge point 157, it passes the flow meter 155, which measures the flow rate and discharge time of the liquid and provides this information to the controller assembly 200 so that it can determine the amount of liquid being discharged.

It should be understood that the system is considered unique in that for this specific application, for example, a heated recirculation system is provided which enables supersaturated feed supplements to be maintained on-site and in an immediately available condition which can be programmed to automatically provide a metered amount of supplement, as well as monitoring the amount of supplement available for use.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A storage and metering system for delivery of a supersaturated feed supplement to a feed processing facility, said system comprising:
   a storage tank assembly for storing said supersaturated feed supplement;
   a recirculation and discharge system connected to the storage assembly, said system maintaining at least a portion of the supersaturated feed supplement at an elevated temperature during recirculation, wherein said system comprises a first line section, a second line section, and a third line section, wherein each of said line sections comprise a pipe having a barrier layer surrounded by an insulation layer surrounded by a jacket layer; and
   a controller assembly for monitoring and controlling the supersaturated feed supplement being recirculated and discharged.

2. The storage and metering system of claim 1, further comprising a first heating element located within said storage tank assembly to heat said supersaturated feed supplement.

3. The storage and metering system of claim 1, further comprising an agitator located within said tank assembly for continuously circulating said supersaturated feed supplement within said storage tank assembly.

4. The storage and metering system of claim 1, further comprising a pump to provide said supersaturated feed supplement to said recirculation and discharge system.

5. The storage and metering system of claim 4, wherein said pump comprises a positive displacement pump.

6. The storage and metering system of claim 1, wherein said recirculation and discharge system comprises a conduit to provide said supersaturated feed supplement to a discharge point or to said tank assembly.

7. The storage and metering system of claim 1, further comprising a second heating element positioned adjacent at least a portion of at least one of said first, second and third line sections.

8. The storage and metering system of claim 1, wherein said recirculation and discharge system comprises a selectable valve to route said supersaturated feed supplement to a desired outlet or to said tank assembly.

9. The storage and metering system of claim 8, wherein said controller assembly monitors the amount of said supersaturated feed supplement provided to said desired outlet.

10. The storage and metering system of claim 8, wherein said controller assembly controls said selectable valve.

11. The storage and metering system of claim 1, further comprising a level monitor to determine the location of the top surface of said supersaturated feed supplement within said tank assembly.

12. The storage and metering system of claim 1, wherein said recirculation and discharge system further comprises a flow meter to monitor the amount of said supersaturated feed supplement being discharged.

13. A method for storing and metering delivery of a supersaturated feed supplement, comprising the steps of:
   storing and maintaining said supersaturated feed supplement at an elevated temperature within a tank assembly;
   dispensing said supersaturated feed supplement from said tank assembly into a recirculation and discharge system;
   maintaining said elevated temperature of said supersaturated feed supplement while it travels through said recirculation and discharge system; and
   providing said supersaturated feed supplement to a discharge point or to said tank assembly under control of a controller assembly.

14. The method of claim 13, further comprising monitoring the temperature of said supersaturated feed supplement within said tank assembly.

15. The method of claim 13, further comprising measuring the volume of said supersaturated feed supplement being discharged.

16. The method of claim 13, further comprising continuously agitating said supersaturated feed supplement within said tank assembly.

17. The method of claim 13, wherein said elevated temperature is between about 40° F. and 160° F.

18. A storage and metering system for delivery of a supersaturated feed supplement, comprising:
   a storage tank assembly for storing said supersaturated feed supplement, said tank assembly having an inlet and an outlet, said storage tank assembly having a fixed ceiling and floor;
   a first heating element within said tank assembly to maintain said supersaturated feed supplement at a preselected temperature;
   a pump connected to said tank assembly to discharge said supersaturated feed supplement from said tank assembly;
   a first line section connected to said pump for providing said supersaturated feed supplement to a discharge point;
   a second line section connected to the first line section for recirculating said supersaturated feed supplement back to said storage tank assembly;

a second heating element adjoining said second line section to maintain said supersaturated feed supplement at an elevated temperature while said supersaturated feed supplement is being recirculated;

a selectable valve connected between said first line section and said second line section, to selectively provide said supersaturated feed supplement from said first line section to either said second line section or said discharge point; and a controller assembly for controlling said selectable valve.

19. The storage and metering system of claim 18, further comprising a flow meter coupled to said first line section to determine an amount of said supersaturated feed supplement provided to said discharge point.

20. The storage and metering system of claim 19, wherein said flow meter is further coupled to said controller assembly to provide metering information to said controller assembly.

* * * * *